United States Patent [19]

Gaske et al.

[11] 4,433,014

[45] Feb. 21, 1984

[54] PIGMENTED, CORROSION RESISTANT, THERMOSETTING COATING COMPOSITIONS

[75] Inventors: Joseph E. Gaske, Mt. Prospect; Hannu K. Pennanen, Elk Grove, both of Ill.

[73] Assignee: DeSoto, Inc., Des Plaines, Ill.

[21] Appl. No.: 390,707

[22] Filed: Jun. 21, 1982

[51] Int. Cl.$^3$ .............................................. B05D 3/02
[52] U.S. Cl. ................................... 427/380; 427/410; 523/458; 523/466
[58] Field of Search .................. 523/458, 451, 466; 427/380, 410

[56] References Cited

U.S. PATENT DOCUMENTS

| | | | |
|---|---|---|---|
| 3,262,903 | 7/1966 | Robertson | 523/458 |
| 3,759,751 | 9/1973 | Smith | 523/458 |
| 4,210,569 | 7/1980 | Sysjuk et al. | 523/458 |

*Primary Examiner*—Lewis T. Jacobs

*Attorney, Agent, or Firm*—Dressler, Goldsmith, Shore, Sutker & Milnamow, Ltd.

[57] ABSTRACT

A pigmented, thermosetting organic solvent solution coating composition having improved capacity to resist acid rain is disclosed in which a resinous polyepoxide, a phenoplast resin cross-linking agent for said polyepoxide (preferably a xylolol-formaldehyde condensate), a phosphoric acid ester catalyst, a chromium-containing pigment providing resistance to corrosion, and a clay having the capacity to fix phosphate, are combined. For package stability, the catalyst is the reaction product of ortho phosphoric acid with an aliphatic diol, there being sufficient hydroxy in said diol to provide at least 1 equivalent of hydroxy for each acid equivalent in said phosphoric acid. These coatings are applied as a prime coating which is baked to remove solvents and provide a dry film without removing the phosphoric acid contained therein. The dry primer is then overcoated with a topcoat, and the doubly coated substrate is baked to cure the first coating.

14 Claims, No Drawings

PIGMENTED, CORROSION RESISTANT, THERMOSETTING COATING COMPOSITIONS

DESCRIPTION

1. Technical Field

This invention relates to the coating of metal substrates which are exposed to the elements in order to provide resistance to corrosion on such exterior exposure.

2. Background Art

The coating of metal substrates to provide corrosion resistance on exterior exposure is a very old problem, but the parameters of the problem have changed in recent years with the increasing acidity of the atmosphere and the rain which results from these acidic environmental conditions. As a result, the coatings which are used to protect metal surfaces, and especially steel surfaces, must provide protection under more acidic conditions than heretofore, and this has presented a considerable difficulty. It is the objective of this invention to provide thermosetting coatings having an enhanced capacity to resist the acidic environments now encountered on exterior exposure in some regions, and also to provide methods which will enable the effective use of these coatings.

DESCRIPTION OF INVENTION

In accordance with this invention, a pigmented, corrosion resistant, thermosetting organic solvent solution coating composition is provided in which a resinous polyepoxide and a phenoplast resin cross-linking agent therefor are combined with a phosphoric acid ester catalyst, a chromium-containing pigment and a clay having the capacity to fix phosphate. The chromium pigments are themselves well known for use in corrosion resistant coatings.

The phenoplast resin is preferably a xylolol-formaldehyde condensate because such resins provide the best color properties. The clays having superior capacity to fix phosphate are kaolinite clays.

The use of phosphoric acid ester catalysts to cure polyepoxides with aminoplast or phenoplast resins is known, and various alcohols, like butanol, or polyepoxides, like those referred to later, may be reacted with acids of phosphorous, like ortho phosphoric acid or pyrophosphoric acid, in various proportions to provide a catalyst. While polyols containing more than two hydroxy groups should have catalytic quality, they tend to form bicyclic products on heating which are dangerous. Moreover, while the known phosphoric acid ester catalysts are effective for cure, coating compositions containing them lack storage stability.

It is important to provide coating compositions which are package stable. These are formed by including in the composition a catalyst formed by reacting ortho phosphoric acid with an aliphatic diol using at least 1 equivalent of hydroxy in the diol for each acid equivalent in the phosphoric acid. Neopentyl glycol is preferred, but any diol, such as ethylene glycol, propylene glycol, butylene glycol or hexane diol may be used.

The phosphoric acid ester-catalyzed systems of this invention are intended to be used as prime coatings and not as finish coatings. This is because the coatings must be baked at a temperature high enough to provoke the desired thermosetting cure, but at such temperature, the phosphoric acid ester catalysts vaporize and the cure is not achieved. As a result, and in this invention, the coating composition is applied and baked to remove solvents to the point where a dry film is obtained without removing the phosphoric acid contained therein. This prime coating is then overcoated and the doubly coated substrate is then baked at a temperature and for a time sufficient to cure the first coating (which also cures the topcoat if it is of thermosetting character, which is normally the case).

This invention has several significant features, and one of these is the unusual stability characteristics provided by the phosphoric acid-diol reaction products in the coating compositions of this invention.

If a solution of ortho phosphoric acid and n-butanol is made using stoichiometric proportions of these components and the solution is incorporated in a typical coating composition in this invention, and if that coating composition is stored in an unlined steel container at 130° F. for 68 hours, it loses its cure capacity. Interestingly, whatever occurred to cause the loss of cure capacity, it did not affect the steel surface of the container which was not etched.

Using the phosphoric acid-diol solution of this invention in the same coating composition, and storing it in the same way in the same unlined steel container, the composition again loses its cure capacity, but this time the steel surface of the container is badly etched.

On the other hand, in a glass or polymer-lined container, the coating composition containing the phosphoric acid-butanol catalyst still loses its cure capacity, but the coating composition containing the phosphoric acid-diol catalyst was indefinitely stable, and the composition retains its capacity to cure on baking. The action of the two similar compositions is entirely different, and this difference is difficult to explain.

The cure reaction takes place in one hour when a peak metal temperature of about 250° F. is reached, and when oven exposure produces a 350° F. peak metal temperature, the cure takes place in about 10 minutes. Normal cure practice in this invention uses a 500° F. oven temperature and a dwell time within the oven of 30 seconds which produces a peak metal temperature intermediate those discussed. A peak metal temperature of 400° F. to 420° F. is considered optimum.

The resinous polyepoxides which are employed in this invention should have a molecular weight of at least about 500, preferably at least 2000 and a 1,2-epoxy equivalency of at least about 1.3, preferably at least about 1.7. The upper limit of molecular weight is not precise, but is about 10,000. Diglycidyl ethers of a bisphenol, such as bisphenol A, are preferred and this class of materials is well known and will be illustrated herein by Epon 1009 of Shell Chemical Company which has a molecular weight of about 8000.

Phenoplast resins are also well known and are known curing agents for polyepoxides. These are solvent-soluble, heat-hardening, reaction products of formaldehyde with phenol, xylol or a derivative thereof, like t-butyl phenol. Xylolol-formaldehyde condensates are preferred since other phenolics do not possess the same excellent color stability, but these are otherwise fully useful. The xylolol-formaldehyde condensates are available in commence, one convenient source being the Methylon resins sold by General Electric.

The relative proportions of phenoplast to resinous polyepoxide is itself known and is not the essence of this invention. It is convenient to use a weight ratio of phenoplast to polyepoxide of from 1:1 to 1:15, more preferably from 1:2 to 1:8.

It is important to acid rain resistance in combination with resistance to other corrosive agents to have present in the coating materials which will provide both anionic and cationic protection.

The desired anionic protection is provided by the presence of a chromium-containing pigment known to provide corrosion protection. These are used in a pigment to binder weight ratio of from 0.1:1 to 1:1, preferably from 0.3:1 to 0.8:1. The binder is constituted by the polyepoxide and the phenoplast. Chromate pigments providing corrosion protection are well known and are illustrated herein by strontium chromate.

The desired cathodic protection is provided by the phosphoric acid component of the catalyst, and this is why one cannot overly bake the prime coat since this will volatilize the phosphoric acid and impair the desired corrosion protection. Instead, and when high temperature is used in the desired bake, the phosphoric acid is trapped when heated and it is in the presence of a clay having an anion-exchange capacity of at least about 10 milliequivalents per 100 gms, preferably at least about 20 milliequivalents. Many clays are known to have this capacity, but Kaolinite clays having a strong anion exchange capacity are readily available and are preferably used herein.

It is desired to point out that the capacity of mineral clays to fix phosphate is itself well known and is utilized herein, but the provision of thermoset prime coatings containing both anionic and cationic protection and utilizing this known capacity of clays is not known.

The clays may be used in about the same weight ratio as the chromium-containing pigment, namely: from 0.1:1 to 1.0:1, preferably from 0.3:1 to 0.8:1.

The proportion of phosphoric acid ester catalyst should be such as to provide at least 0.1% of phosphoric acid based on the solids content of the coating composition, preferably at least 0.3%. It is preferred to use from 0.5% to 1.5% on the same basis, and up to about 5% of the acid may be present, though the upper limit is not precise.

EXAMPLE 1

43.58 parts of neopentyl glycol are placed in a glass container and, with simple stirring, add 24.2 parts of methyl ethyl ketone. While stirring slowly add 32.22 parts of 85% ortho-phosphoric acid. Stir until the solution is clear. The temperature which was initially at room temperature is seen to drop to about 50°–55° F., so an endothermic reaction takes place.

EXAMPLE 2

Load a pebble mill with:

| Parts | Component |
|---|---|
| 297.84 | 40% solution of Epon 1009 in diacetone alcohol |
| 168.78 | Diacetone alcohol |
| 97.3 | Kaolinite clay - Hydrite R of Georgia Kaolin Co. may be used |
| 78.43 | Titanium dioxide, rutile |
| 39.71 | Strontium chromate pigment |
| 21.84 | SC-150 aromatic hydrocarbon solvent mixture |
| 1.49 | Bentone 27 (National Lead) [premixed with the SC-150] |

The above materials are ground to a 7.0 North Standard fineness gauge and drained from the grinding mill. The mill is then washed with 72.48 parts of a 40% solution of Epon 1009 (Shell Chemical Co.) in diacetone alcohol and 57.58 parts of additional diacetone alcohol. The washings are combined with the product of the mill.

Premix 37.73 parts of xylolol-formaldehyde resin (the General Electric product Methylon 75108 may be used) with 28.79 parts of aromatic hydrocarbon solvent (SC-150) and 8.85 parts of the catalyst solution of Example 1. Ordinary stirring is then employed to uniformly mix together the premixture here described with the milled mixture described previously.

The mixture which has been prepared is a storage-stable paint and it can be applied by brush to a steel panel to provide a wet coating having a thickness of ¼ to ½ mil and the wet coated panel is dried by warming for 3 minutes in an oven maintained at 350° F.

The prime-coated panel is then topcoated by spraying with an automotive acrylic finish which is a solution copolymer of 57% methyl methacrylate, 30% n-butyl acrylate, 3% acrylic acid and 10% 2-hydroxy ethyl acrylate. The coated product is then baked for 20 minutes in a 350° F. oven to provide a cured coated panel which is resistant to $SO_2$ and $NO_2$-containing atmospheres.

What is claimed is:

1. A pigmented, corrosion resistant, thermosetting organic solvent solution coating composition comprising, a resinous polyepoxide, a phenoplast resin crosslinking agent for said polyepoxide, a phosphoric acid ester catalyst which is the ester reaction product of ortho phosphoric acid with an aliphatic diol, a chromium-containing pigment providing resistance to corrosion, and a clay having the capacity to fix phosphate.

2. A coating composition as recited in claim 1 in which said phenoplast resin is a xylolol-formaldehyde condensate.

3. A coating composition as recited in claim 1 in which said clay has an anion-exchange capacity of at least about 10 milliequivalents per 100 grams of clay.

4. A coating composition as recited in claim 3 in which said clay and chromium-containing pigment are each present in a weight ratio with respect to the total weight of said polyepoxide and said phenoplast of 0.1:1 to 1:1.

5. A coating composition as recited in claim 1 in which said resinous polyepoxide is a diglycidyl ether of a bisphenol having a molecular weight of from 500 to about 10,000 and a 1,2-epoxy equivalency of at least about 1.3.

6. A coating composition as recited in claim 5 in which said resinous polyepoxide has a molecular weight of at least 2,000 and a 1,2-epoxy equivalency of at least about 1.7.

7. A coating composition as recited in claim 6 in which said clay has an anion-exchange capacity of at least about 20 milliequivalents per 100 grams of clay and said chromium-containing pigment is a chromate pigment.

8. A coating composition as recited in claim 7 in which said clay and said chromium-containing pigment are each present in a weight ratio with respect to the total weight of said polyepoxide and said phenoplast of 0.3:1 to 0.8:1.

9. A coating composition as recited in claim 8 in which said phosphoric acid catalyst is present in an amount of from 0.1% up to about 5% based on the weight of the solids content of the coating composition.

10. A pigmented, corrosion resistant, thermosetting organic solvent solution coating composition comprising, a polyglydicyl ether of a bisphenol having a molecular weight in the range of 2,000 to 10,000 and a 1,2-epoxy equivalency of at least 1.3, a xylolol-formaldehyde condensate cross-linking agent for said polyglycidyl ether in a weight ratio of cross-linking agent to polyepoxide of from 1:1 to 1:15, a phosphoric acid ester catalyst which is the ester reaction product of ortho phosphoric acid with an aliphatic diol, a chromate pigment, and a clay having the capacity to fix phosphate, said pigment and said clay being each present in a weight ratio with respect to the total weight of said polyepoxide and said xylolol-formaldehyde condensate of from 0.1:1 to 1:1, said clay having an anion-exchange capacity of at least about 10 milliequivalents per 100 grams of clay and said phosphoric catalyst being present in an amount of at least 0.3% based on the weight of the solids content of the coating composition.

11. A coating composition as recited in claim 10 in which said clay is a kaolinite clay.

12. A package stable pigmented, corrosion resistant, thermosetting organic solvent solution coating composition comprising, a resinous polyepoxide, a phenoplast resin cross-linking agent for said polyepoxide, and a phosphoric acid ester catalyst which is a solution in an organic solvent of the reaction product of ortho phosphoric acid with an aliphatic diol, there being sufficient hydroxy in said diol to provide at least 1 equivalent of hydroxyl for each acid equivalent in said phosphoric acid and sufficient reaction between the two to provide a clear solution.

13. A coating composition as recited in claim 12 in which said catalyst is present in an amount providing from 0.1% to 5% of phosphoric acid based on the solids content of the coating composition.

14. A method of protecting a metal surface subject to corrosion comprising, applying a coating of the coating composition of claim 1, baking the coating to remove solvents and provide a dry film without removing the phosphoric acid contained therein, overcoating the dry film coating with a topcoat, and baking said doubly coated substrate at a temperature and for a time sufficient to cure said first coating.

* * * * *